Sept. 22, 1959  C. S. McCARTHY ET AL  2,905,024
BRAKE SYSTEM
Filed Aug. 4, 1955  2 Sheets-Sheet 2
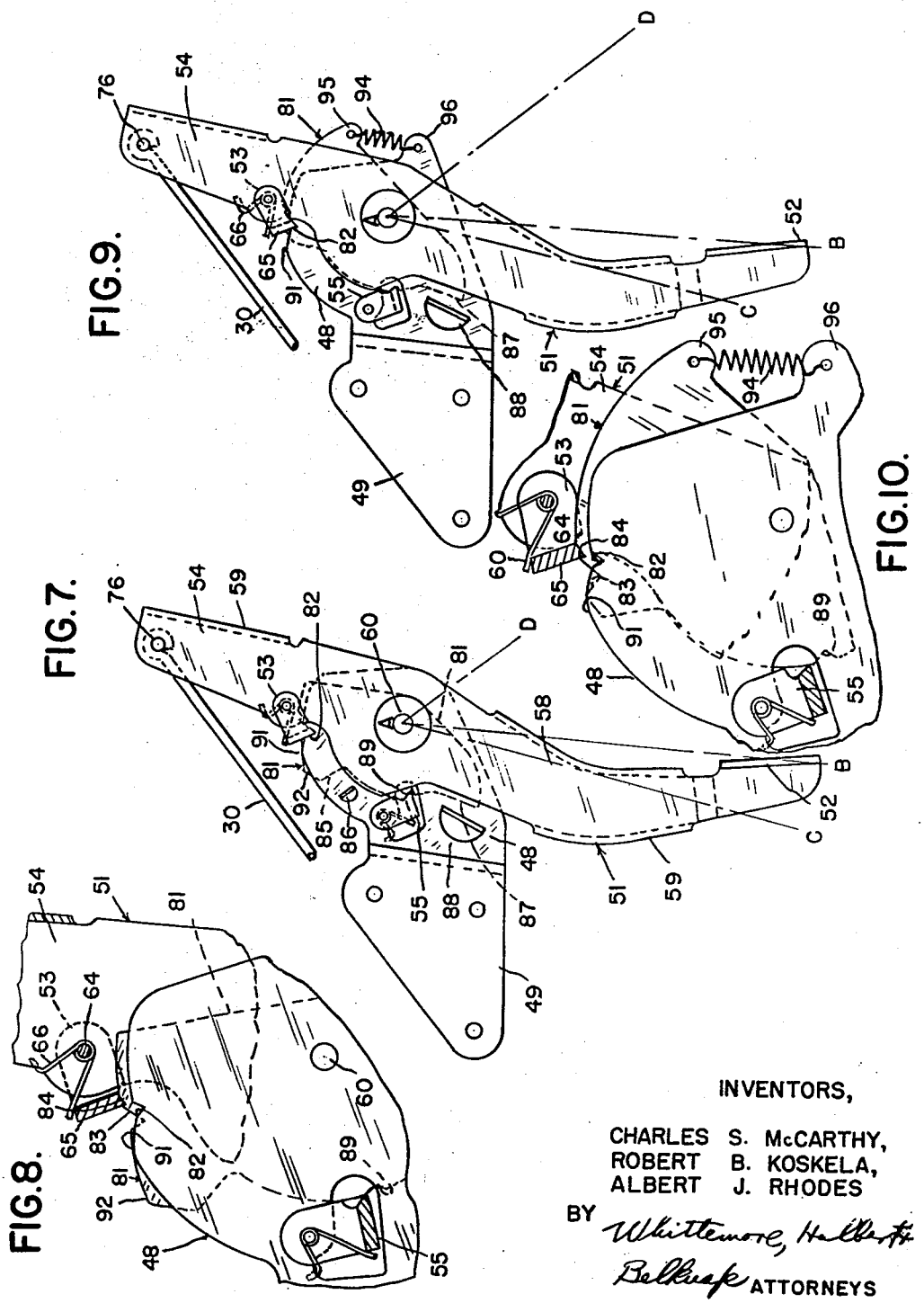
INVENTORS,
CHARLES S. McCARTHY,
ROBERT B. KOSKELA,
ALBERT J. RHODES
BY *Whittemore, Hulbert & Belknap* ATTORNEYS

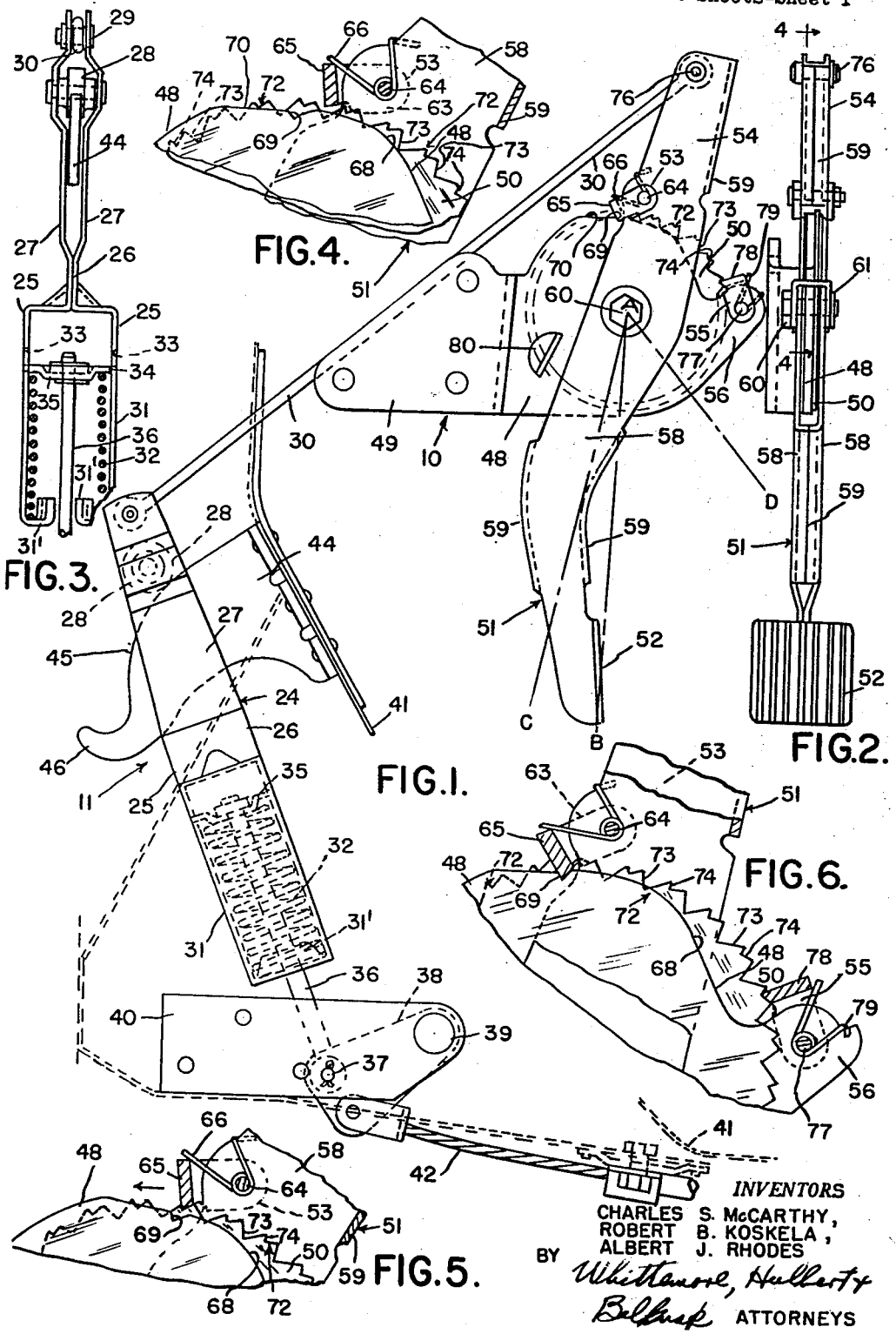

United States Patent Office 2,905,024
Patented Sept. 22, 1959

2,905,024

BRAKE SYSTEM

Charles S. McCarthy, Birmingham, Robert B. Koskela, Pontiac, and Albert J. Rhodes, Lake Orion, Mich., assignors to American Forging & Socket Company, Pontiac, Mich., a corporation of Michigan Application August 4, 1955, Serial No. 526,432

22 Claims. (Cl. 74—539)

The present invention relates to an improved automotive brake system and, more particularly, to a component device or mechanism of such system controlling the application and release of an emergency brake.

Emergency brake control systems as presently embodied in automobiles commonly employ a hand actuated pull rod or lever equipped with releasable rachet holding means whereby a pull on the rod or lever will partially or fully apply the emergency brake and hold the same in applied or actuated condition. A further manipulation to disengage the rachet, followed by a release of holding tension on the pull rod or lever, disengages or releases the emergency brake.

These systems have not been entirely satisfactory, primarily because women find it difficult to apply a pull of sufficient force to a hand operated brake lever or control rod to fully actuate and engage the brake. Accordingly, the use of an emergency brake operated by foot has been proposed, and it appears that such foot operated emergency brake systems will become increasingly prevalent in automobiles. The likelihood of this is indicated by the increasing popularity of automatic transmissions, which eliminate the need to use a foot in the control of a clutch. The left foot can therefore be used in the relatively rare intervals when the application of the emergency brake is called for.

The practicality and feasibility of a foot operated brake are, furthermore, enhanced by the development of improved brake control devices such as are illustrated and described in the co-pending application of Charles S. McCarthy, Serial No. 492,581, filed March 7, 1955. These incorporate yieldable means in the force transmission line or linkage from a brake control member such as a pedal, pull rod or lever to the controlled emergency brake mechanism. This permits a constant braking pressure to be applied, regardless of wear on the brake lining or the like, by a movement of the brake foot pedal, or a pull rod or lever, to the same position on each stroke of the pedal.

It is the general purpose and object of the present invention to provide a holding device or detent mechanism which, upon movement of a brake lever or like member to a brake applying position, as through a variable power device as referred to in the preceding paragraph, and upon a slight controlled release of the lever or member through a few degrees, will hold the lever or member in that position to maintain braking pressure; and which will release the brake when desired upon the reversal of the lever movement through the aforesaid increment of a few degrees, followed by a controlled release of the lever or member against the spring force of its connecting means or linkage. The holding and releasing operations are performed automatically and with absolute reliability by a very simple pawl and detent arrangement which is rugged and capable of being installed at very low cost.

It is a more specific object of the invention to provide a holding mechanism or device for an emergency brake system, which is particularly devised as part of a foot operated system, but which may also be employed as a component of a hand operated system, lever- or pull-rod-controlled, with certain essential lever provisions for a holding segment, control lever and holding pawl constituting part of such system. The mechanism in accordance with the invention, in any of the three embodiments thereof illustrated herein, incorporates a suitable fixed mounting or holding plate which is suitably supported by a bracket at the operator's position in the automobile interior; a foot controlled pedal or lever, or other equivalent lever in the event the mechanism is part of a hand operated installation, which lever is pivoted on the mounting or holding plate and carries a spring urged pawl adapted to ride over a shaped edge of the plate upon oscillation of the lever; and a movable segmentlike control member, disk or segment also pivoted on the holding plate coaxially of the lever pivot. The control segment is provided with one or more pairs of holding and release formations or notches with which the pawl on the lever is adapted to engage alternately as the lever is manipulated in applying and releasing the brake. Of this pair of notches (there being a plurality of successive like pairs in one embodiment of the invention and a single pair in the other two illustrated embodiments), one notch is relatively deep and the other relatively shallow.

The fixed holding plate is also provided with a holding notch, into which the pawl on the lever is permitted to drop, thereafter holding the lever against resiliently urged release movement when the lever is in brake applying position. This pawl movement is controlled by the deeper notch of the movable control segment of the mechanism, into which the pawl falls at the end of a full brake applying movement of the lever. The deeper notch permits a spring urged drop of the pawl into the holding notch of the mounting or holding plate, after a slight lost motion, lever release movement of a few degrees of the pedal lever. However, when the pedal lever is given a slight movement in the brake applying direction, opposite from the lost motion movement just referred to, and against the spring tension of the connector linkage, the pawl will then snap into a shallower notch of the movable control segment. The pawl is thus held above the fixed holding plate notch, in the radial sense. Accordingly the pedal lever is conditioned by such withdrawal of its pawl to move freely in a release direction when the pedal is released by the foot against the resilient force of its connecting linkage to the brake.

A further and more specific object of the invention is to provide a brake actuator and release mechanism of the above description which has maximum simplicity and compactness of construction, due to the fact that the holding plate and movable member, whether the latter carries a multiplicity of pairs of holding and release notches arranged in continuous succession about the circumference of a generally circular disk, as in one embodiment, or is in the form of a simple segment mounted for pivotal oscillatory movement and provided with but a single pair of deeper and shallower notches, as in the other two illustrated forms, may be inexpensively stamped out of a suitable gauge of sheet metal and in which an improved coaxial arrangement of the lever, fixed holding plate and movable member or segment results in an extremely compact and rugged device, inexpensively manufactured and installed, and capable of unfailingly reliable operation.

The foregoing as well as other objects will be made more apparent as this description proceeds, especially when considered in connection with the accompanying drawings, wherein:

Fig. 1 is a fragmentary view in side elevation illustrating one embodiment of the improved mechanism according to the invention, as associated with a portion of a brake actuator linkage of an automotive emergency brake system;

Fig. 2 is a view in end elevation of the mechanism of Fig. 1, as viewed from the right of that figure;

Fig. 3 is a fragmentary view in end elevation, as from the left of Fig. 1, illustrating a spring compensating unit of the connecting linkage with which the improved holding and release mechanism is associated;

Fig. 4 is a fragmentary view in enlarged scale, partially broken away and in vertical section along line 4—4 of Fig. 2, showing one position of the lever and holding pawl of the mechanism relative to a fixed holding plate and movable control member or segment;

Figs. 5 and 6 are fragmentary views similar to Fig. 4 showing the parts in other relative positions thereof which they assume in the operation of the mechanism;

Fig. 7 is a side elevational view of a holding and release mechanism according to a modified embodiment of the invention;

Fig. 8 is an enlarged fragmentary view, partially broken away and in section similar to Figs. 4, 5 and 6, of the modified adaptation of the invention;

Fig. 9 is a side elevational view similar to Fig. 7, of a further modified form; and Fig. 10 is a fragmentary view, partially broken away and in section similar to Fig. 8, of the embodiment of Fig. 9.

The improved emergency brake holding and release mechanism of the invention, in one of its available embodiments, is generally designated in Fig. 1 by the reference numeral 10, and the spring compensating, power multiplying linkage with which the mechanism is associated for the transmission and release of brake control force is designated by the reference numeral 11. This device or linkage may be constructed in general in accordance with the disclosure of a co-pending application of Charles S. McCarthy, Serial No. 492,581, identified above; and in regard to this linkage or device no claim of invention is made in the present application, other than in regard to its structural and functional relationship to the device or mechanism 10.

As indicated above, the device 11 constitutes a power multiplier to increase the mechanical advantage of the forces applied to the actuator and release mechanism 10, and to insure the application of a constant braking pressure to the brake by interposing yieldable means in the line of force application between mechanism 10 and the emergency brake of the installation.

Generally considered, the device 11 just referred to comprises a tensioning member 24 constituted by a pair of opposed elongated pieces 25 which may be welded to one another at 26 and are bent outwardly away from one another to afford laterally spaced upper arms 27 shaped to journal therebetween a cam follower roller 28. The upper ends of the arms 27 are held against separation by a transverse pin 29, which extends through an eye at the end of a pull rod 30, the opposite end of which is connected to the brake actuating and control mechanism 10. The arms 25 are separated beneath the welded connection 26 to provide spaced spring guard and guide walls 31, the lower ends of which are brought inwardly and upwardly at 31' to seat and sustain the lower end of a coil compression spring 32. Transversely aligned, vertically extending slots 33 are formed in the wall portions 31, receiving oppositely extending ears 34 of washer 35, which rides on the upper end of coil spring 32. This washer is secured to a tension rod 36, and the opposite end of tension rod 36 is pivotally connected at 37 to a bell crank or rocker member 38. Member 38 is in turn pivoted at 39 on a bracket 40 which is fixedly mounted to the automobile, as to a rigid frame member beneath the floor board 41 at the front seat compartment of the automobile. A tension cable 42 is pivotally connected to bell crank or rocker 38 and extends to the emergency brake.

The device 11 further comprises a bracket-plate 44 rigidly supported on the floor board or corresponding support, which plate is contoured to provide a curved cam surface 45 along its forward and upper edge, and the cam follower roller 28 rides along this surface in the operation of the brake. Its forwardmost, fully released position is limited by an upturned nose extremity 46 of plate 44.

Tension upon the pull rod 30 causes follower roller 28 to ride upwardly on cam surface 45, thus transmitting a pull of magnified degree to the tension member 24 of device 11. However, the magnitude of this force, as applied to brake operating cable 42, is controlled and made uniform by the compensating spring 32 interposed between the member 24 and the tension rod 36, which is connected through rocker 38 with cable 42. Thus, the applying and release mechanism 10 is enabled to move the emergency brake to position to apply a constant braking pressure, regardless of brake lining wear or other related factors, by the interposition of the yieldably stressed connecting and power increasing device 11.

The mechanism 10 has as its basic components a fixed mounting and holding plate 48 including a bracket portion 49 appropriately secured on a suitable rigid mount (not shown) adjacent the driver's position in the automobile, forwardly and to one side of the driver's seat; a movable control disk or member 50 which is, in this embodiment, of a generally circular outline; an actuating and release lever 51 shown as the actual pedal lever of the control mechanism and equipped with a pedal extremity 52; a holding pawl 53 pivoted on an upper extension 54 of lever 51, immediately above plate 48 and disk 50; and a further holding dog 55 which engages disk 50 alone and is pivoted on an extension 56 of plate 48 immediately adjacent disk 50.

As illustrated in Fig. 2, the lever 51 may be constituted by a pair of parallel, laterally spaced lever arms 58 which are rigidly connected to one another to constitute an integral lever unit by means of cross webs 59 on either edge of the lever unit, the connecting web portions being omitted on opposite sides of the associated holding plate 48 and control disk 50. Plate 48 and disk 50 are received between the lever arm portions 58 in side-by-side relation to one another.

As illustrated in Fig. 2, the holding plate 48 is relatively thick, in order to make it sufficiently rigid and rugged to hold lever 51 against the retractile force of the spring compensating and connecting device 11. Disk 50 need only be of sufficient thickness to maintain its flat condition under the relatively slight forces exerted thereon by pawl 53 when the lever 51 is manipulated.

The lever 51 is pivoted adjacent its midpoint on the mounting and holding plate 48 by means of a transverse pivot stud or pin 60 extending through the plate, and the same stud pivotally mounts the control disk 50, being in a coaxial relation to the generally circular outer contour of disk 50. Suitable nut and cotter pin provisions 61, or their equivalent, are applied to the end of stud 60 to hold the same in place, without unduly compressing the lever, plate and disk assembly in a way to interfere with free oscillatory and intermittent rotative movements of the lever and disk, respectively.

The holding pawl 53 may be of U-shaped cross sectional outline, bridging the rearward edge of lever 51 with its parallel arms 63 in side-by-side relation to the outer surfaces of the opposed lever arms 58. A suitable pin 64 pivots pawl 53 in this position, with the cross-piece 65 of the pawl which connects the pawl arms serving as the actual pawl piece. It is urged in counterclockwise direction by means of a spring 66 encircling pivot pin 64 and engaging lever 51 and cross-piece 65. So urged, the pawl 53 alternately engages an outer, specially shaped edge of control disk 50 and an outer, specially shaped holding edge or surface of holding plate 48 in conditioning pawl piece 65 for the operation of the mechanism. The pawl piece 65 either takes holding and locking engagement with the holding plate 48 after pedal lever 51 has been actuated to brake applying position or is prevented by control member 50 from taking such engagement upon a subsequent releasing manipulation of lever 51.

As best shown in Figs. 4, 5 and 6, the holding plate 48 has a curved outline along its upper portion, as indicated at 68. This curved portion merges into a holding notch 69 in the plate periphery which is sufficiently deep to restrain lever 51 against counterclockwise movement under the resilient forces of device 11, once the pawl piece 65 drops into notch 69. This is the sole notch formation in the holding plate 48 of the form of Figs. 1 through 6, as it is also the only notch formation in the alternative embodiments. Forwardly of notch 69 the plate contour simply provides a smooth, generally horizontal cam edge surface 70 along which pawl piece 65 may ride when disengaged from notch 69 and when lever 51 moves counterclockwise. The edge surface 70 merges forwardly into the otherwise curvilinear contour of plate 48.

The control disk 50 is provided about its entire peripheral edge surface with successive notch formations 72 in immediate succession to one another. Each of these formations is made up of a first, relatively deep notch portion 73 and a second, relatively shallow notch portion 74. Adjacent the holding notch 69 of plate 48, the control disk 50 is of slightly greater overall radius than the radial dimension of plate 48 at notch 69. However, of each notch pair 72, the larger notch 73 is sufficiently deep that, when pawl piece 65 is engaged therein, it will permit the pawl piece 65 to drop into holding notch 69 under the force of spring 66, upon counterclockwise rotation of a lever 51 to bring the two notches into transverse register with one another. The smaller notch 74 of each pair is, on the other hand, sufficiently shallow that it will not, when engaged by pawl piece 65, permit the pawl piece to drop into notch 69 upon corresponding counterclockwise lever movement. It is the function of the forward cam edge 70 of holding plate 48 to cam the pawl piece 65 out of the shallow notch 74 after a predetermined counterclockwise rotation of control disk 50 with lever 51, leaving dog 55 in angular register with a deep notch 74 of movable control disk 50, hence permitting pawl piece 65 to latch into another deep notch 74.

The upper end of the elongated pull rod 30 is pivotally connected at 76 to the upper extremity of lever extension 54, causing the lever to be tensioned upon clockwise movement of the lever in applying the brake.

The holding dog 55 is pivoted at 77 on the extension 56 of holding plate 48. It has a detent piece 78 which is urged counterclockwise by a spring member 79. Dog 55 alternately engages in the large and small notches 73, 74 respectively, of control disk 50, upon successive manipulations of lever 51, thus to hold the control disk 50 against retrograde movement as the lever is swung clockwise. The dog 55 is in register with a deeper notch 73 of control disk 50 when counterclockwise movement of the latter is terminated by the cam-out action of plate edge 70 on pawl piece 65. A fixed stop 80 on holding plate 48 limits clockwise swing of lever 51, and with the lever in the thus limited position the pawl piece 65 always engages in a deep notch 73.

In the operation of the control mechanism 10 as depicted in Figs. 1, 4, 5 and 6, the position of the parts is shown in Figs. 1 and 6 in a holding position, with the brake applied. A theoretical line A—B through pivot stud 60 and the vertical center of brake pedal 52 represents, in Fig. 1, the position of pedal lever 51 in this holding condition. Holding pawl piece 65 is engaged in a larger notch 73 of control disk 50, having been so engaged by the full clockwise swing of lever 51 against stop 80; and upon the ensuing counterclockwise rotation of disk 50 by lever 51, as the lever is released and returns a few degrees to line A—B, has also been spring urged into the holding notch 69 of plate 48, as the two notches came into transverse alignment. At this time the other anti-retrograde holding dog is engaged in a smaller notch 74 of one of the other notch pairs. Pawl 53, in thus engaging holding plate 48, prevents counterclockwise or releasing movement of lever 51 under the considerable tension stored up in the compensating connecting device 11.

In the event it is desired to release the brake, the pedal 52 is depressed forwardly a slight amount to the position of the theoretical line A—C through pivot stud 60. This causes pawl piece 65 to move clockwise with lever 51 slightly past the position illustrated in Fig. 5, always dropping into a shallow notch 74 at this time, whereupon a release of the pressure on pedal 52 will return the lever 51 fully in counterclockwise direction as indicated by the arrow in Fig. 5. The pawl piece rides past and fails to drop into the holding notch 69 of plate 48 during the counterclockwise motion in the direction of the arrow last referred to. As this motion occurs, the anti-retrograde holding dog 55 rides out of the notch previously engaged thereby and continues to ride out of succeeding notches as the pawl 53 travels counterclockwise with lever 51, and correspondingly drives control disk 50 in a counterclockwise direction. This returns the lever 51 to a fully released position, on the theoretical line of inclination A—D through the lever pivot stud 60. As the lever moves counterclockwise pawl 53 rides on the cam edge 70 of 48 and is cammed out of engagement with disk 50, with the disk in a position to engage dog 55 in a deep notch 74. As an alternative, the cradle-like nose extremity 46 of the power cam 14 may serve as a limit stop to end counterclockwise movement of the lever with dog 55 in register with a deep notch 74.

When it is desired to again apply the brake, pedal 52 is fully depressed forwardly to the theoretical line of lever inclination A—C, the lever engaging stop 80. Such clockwise rotation of lever 51 carries pawl piece 65 to the extreme overrun position shown in Fig. 4, in which it will preliminarily engage a large notch 73 of disk 50. Release of pedal 52 will then enable the spring force of device 11 to rotate lever 51 a few degrees counterclockwise, until pawl piece 65 and its engaged notch 73 come into transverse register with holding notch 69. In this position, the orientation of the brake lever is again along theoretical line A—B of Fig. 1, and the brake is held engaged. It is released by a repetition of the sequences just described, assisted in each instance by the action of holding dog 55 in preventing retrograde, clockwise rotation of control disk 50.

In a system employing a resilient connection such as that of unit 11 between the brake actuator and brake, a single fixed holding formation or notch 69 will suffice to hold the actuator, since the torque on the latter is predeterminedly limited. Lacking such spring compensation, and in an installation permitting application of very powerful brake forces, it is advisable to multiply the strength of the holding provisions, as by the use of two pawl holding notches on the fixed holding plate.

The embodiment of Figs. 7 and 8 of the drawings differs from the form just described in that it is considerably simpler in its structural features, although the underlying principle of alternate engagement and disengagement of a holding pawl with a holding notch in a fixed plate is the same. The mechanism of Figs. 7 and 8, like that of Figs. 9 and 10 to be described, employs but a single pair of larger and smaller notches on a control member which in each case takes the form of an oscillatory segment, as distinguished from an intermittent and unidirectionally rotative control disk. In each of the modifications of Figs. 7 and 8 and of Figs. 9 and 10 there are parts and structural relationships which correspond to parts and relationships illustrated and described above in connection with Figs. 1 through 6. Accordingly, in the interest of simplicity and avoidance of repetition, such corresponding parts and relationships will be designated by the same numerals as employed above, and further description thereof in detail will be dispensed with.

As illustrated in Figs. 7 and 8, the brake pedal lever 51 is pivoted to the holding plate 48 on a stud axis 60, in the same fashion as in the first form. A movable control, in this instance in the form of a sector or segment 81 of irregular outline, is also pivoted on axis 60. The provisions for mounting these parts in a side-by-side relationship to one another, as well as in regard to the make-up lever 51, are the same as or fully equivalent to corresponding specific provisions in the first embodiment.

Fixed holding plate 48 is provided with a single holding notch 82, as in the form of Figs. 1 through 6. Movable, control sector or segment 81 carries but a single pair of larger and smaller notches 83, 84, respectively, arranged in immediate succession to one another, as compared with the circumferential series of notch pairs characteristic of the first form. The radial relationship of the respective notches 83, 84 to the fixed holding notch 82 is the same as that of a notch pair 73, 74 to holding notch 69. Rotative movement of the control segment 81 in a counterclockwise direction about the axis 60 is limited by engagement to a radial abutment shoulder 85 on the segment with a fixed stop member 86 projecting from a side of holding plate 48. Rotation of the control segment in the opposite, clockwise direction, as it is returned by pawl piece 65 following a releasing manipulation of lever 51, is also limited by engagement of a further radial shoulder 87 on the opposite extremity of segment 81 with a further lateral projecting stop member 88 on holding plate 48. The same stop member 88 limits clockwise movement of lever 51.

The holding pawl 53 is mounted in substantially the same manner as depicted in Figs. 1 through 6, and is spring urged about its pivot on lever 51 in the same manner. The holding dog 55 is, in this instance, positioned somewhat differently on plate 48 than in the first embodiment, in the interest of compactness and simplicity of design. As here shown, the segment 81 is equipped with a single anti-retrograde notch 89 which is engaged by the dog 55 to prevent clockwise movement of segment 81 after pawl 53 has engaged plate notch 82 to hold the brake.

In operation, and assuming that the intermediate and extreme positions of the pedal lever 51 correspond to the theoretical lines A—B, A—C and A—D, as in Fig. 1, the locked and held position of the mechanism is the same as in Fig. 1, lever 51 being orientated along the theoretical line A—B. Anti-retrograde dog 55 is engaged in notch 89 to lock control segment 81 from clockwise movement upon the ensuing manipulation of lever 51. Such manipulation is a clockwise rotation of lever 51 through a few degrees, sufficient to engage one of its lever arms 58 with the stop 88, and to bring pawl piece 65 into alignment with the smaller notch 84 of control segment 81.

This is followed by a release of the lever 51 against the tension of device 11, during which the small notch 84 prevents pawl 53 from falling into the holding notch 82 of plate 48. As the pawl piece 65 rides forwardly, it is crammed out of notch 84 by a cam surface 91 of the holding plate 48 and it ultimately rides out onto and drops over a shaped end nose or elevation 92 on the control segment, moving counterclockwise relative to segment 81 in this movement. In this position of the parts the brake is fully released and lever 51 lies along the theoretical line A—D.

When the brake is reapplied, pedal 52 is depressed to rotate lever 51 clockwise, and in this movement the rear or inner edge of pawl piece 65 will engage the nose or elevation 92 of the control segment, just described, pulling the segment clockwise so as to restore the segment to a position in which its shoulder, as well as lever 51, abut the stop 88. At the end of this movement, which finds the lever 51 lying along theoretical line A—C, the pawl piece 65 falls into the larger notch 83, conditioning it for reception in the holding notch 82 when the lever is permitted to return to its holding position, along theoretical line A—B.

The embodiment of the invention shown in Figs. 9 and 10 is similar to that of Figs. 7 and 8, differing in the exception that the function performed by the nose element 92 of the control segment 81 of Figs. 7 and 8, i.e., of returning the segment clockwise after its preceding movement, is performed by a coil tension spring 94 connected between an ear extension 95 on segment 81 and an opposed ear extension 96 of holding plate 48. Inasmuch as the stop 86 of the form of Figs. 7 and 8 is functionless in the embodiment of Figs. 9 and 10, it is omitted. Other parts found in the embodiment of Figs. 9 and 10 having corresponding parts in Figs. 7 and 8, are designated by corresponding reference numerals.

In the operation of the modified form of Figs. 9 and 10, pawl piece 65 is allowed to engage holding notch 82 of plate 48 when the larger control segment notch 83 is brought into register with notch 82 upon counterclockwise rotation of lever 51, the lever being then along the theoretical line A—B. Upon a short return stroke to the theoretical line A—C, the pawl piece falls into the small notch 84, and is held against engagement in notch 82 as the lever is rotated counterclockwise, rotating control segment 81 in the same direction. This tensions spring 94, and as the pawl piece rides onto the surface 91 of control plate 48, it is cammed out of the small notch 84, releasing the control segment 81, whereupon spring 94 snaps the control segment clockwise. Its motion in this direction is stopped by engagement of shoulder 87 with stop 88 on holding plate 48. The tension of connecting device 11 continues the motion of lever 51 to its extreme released position, along theoretical line A—D, completing the sequence of operations of the brake mechanism.

While reference has been made in the preceding descriptions to adaptations of the principle of the invention in an automotive brake system, it is to be understood that the principle is equally applicable in other surroundings in which controlled actuating, holding and release manipulations are desirably performed by an automatically self-conditioning mechanism or device. An example might be in connection with the manipulation of a flexible cable type control unit in the many uses to which such unit is put.

However, the improved actuator and release device has pronounced advantages as applied to a brake system. Especially is this the case due to the fact that the operator of an automobile is enabled to have continual foot control of the brake mechanism in the actuating and releasing phases, governing the lever pedal at all times against the very strong spring force set up by the power multiplying and connector mechanism 11. The strength of this force is increased, in effect, by the absence of frictional losses in the operations of the mechanisms 10, 11, so that if the always-present foot control of the lever were not inherent in the present system, the possibility of injury to an operator's leg would exist, due to an uncontrolled snap-back of the lever.

The drawings and the foregoing specification constitute a description of the improved automotive brake system in such full, clear, concise and exact terms as to enable any person skilled in the art to practice the invention the scope of which is indicated by the appended claims.

What we claim as our invention is:

1. An actuator and release mechanism for a brake or like controlled device, comprising a movable control member, a relatively fixed locking member, a movable actuating and releasing member operatively connected to said device, and a holding element on said actuating and releasing member, said relatively fixed member having a holding portion engageable by said element to hold said element and said actuating and releasing member against movement in a releasing direction, said movable control member having portions engageable by said holding element in the movement of said actuating and releasing member to permit and to prevent, respectively, said engagement of said holding element with said holding portion of said relatively fixed member.

2. An actuator and release mechanism for a brake or like controlled device, comprising a movable control member, a relatively fixed locking member, a pivotal actuating and releasing member operatively connected to said device, and a holding element on said actuating and releasing member and yieldably urged in a direction to engage said movable control member and said relatively fixed member, said relatively fixed member having a holding portion engageable by said element to hold said element and said actuating and releasing member against movement in a releasing direction, said movable control member having formations alternately engageable by said holding element in the pivotal movement of said actuating and releasing member to permit and to prevent, respectively, said engagement of said holding element with said holding portion of said relatively fixed member.

3. A mechanism in accordance with claim 2 in which said movable control member comprises a disk journalled on the axis of said pivotal actuating and releasing member for unidirectional rotation and provided with successive sets of said formations about the circumference of the disk.

4. A mechanism in accordance with claim 2 in which said movable control member comprises a disk journalled on the axis of said pivotal actuating and releasing member for unidirectional rotation and provided with successive sets of said formations, and automatically releasable means engaging said disk to prevent retrograde rotative movement thereof.

5. A mechanism in accordance with claim 2 in which said movable control member comprises a segment pivoted for oscillatory movement on the axis of said pivotal actuating and releasing member, said segment being provided with a single pair of said formations, one of which is engaged by said holding element in the releasing movement of said actuating and releasing member to move the segment in the same direction.

6. A mechanism in accordance with claim 2 in which said movable control member comprises a segment pivoted for oscillatory movement on the axis of said pivotal actuating and releasing member, said segment being provided with a single pair of said formations, one of which is engaged by said holding element in the releasing movement of said actuating and releasing member to move the segment in the same direction, said segment having means engaged by said holding element upon actuating movement of said pivotal actuating and releasing member to oppositely move and condition the segment for a succeeding releasing movement of said last named member.

7. A mechanism in accordance with claim 2 in which said movable control member comprises a segment pivoted for oscillatory movement on the axis of said pivotal actuating and releasing member, said segment being provided with a single pair of said formations, one of which is engaged by said holding element in the releasing movement of said actuating and releasing member to move the segment in the same direction, and resilient means urging said segment in the opposite direction.

8. A mechanism in accordance with claim 2 in which said pivotal actuating and releasing member is connected to said controlled device by means resiliently urging the last named member in a release direction.

9. An actuator and release mechanism for a brake or like device, comprising a movable control member, a relatively fixed locking member, a movable actuating and releasing member operatively connected to said device, said actuating and releasing member having a part movable therewith and engageable with said movable control member and said relatively fixed member in a cycle of movements of said actuating and releasing member to hold the latter against movement in a releasing direction and to permit releasing movement thereof, respectively, said movable control member having means coacting alternately with said part of said actuating and releasing member in the movement thereof to permit and prevent, respectively, said holding engagement of said part with said relatively fixed member.

10. An actuator and release mechanism for a brake or like device, comprising a movable control member, a relatively fixed locking member, a movable actuating and releasing member operatively connected to said device by means resiliently urging said actuating and releasing member in a direction to release said device, said actuating and releasing member having a part movable therewith and engageable with said movable control member and said relatively fixed member in a cycle of movements of said actuating and releasing member to hold the latter against movement in a releasing direction and to permit releasing movement thereof, respectively, said movable control member having means coacting alternately with said part of said actuating and releasing member in the movement thereof to permit and prevent, respectively, said holding engagement of said part with said relatively fixed member.

11. A releasable actuator mechanism of the type described, comprising a fixed holding member provided with a holding formation, a holding element mounted for actuating and releasing movements in opposite directions and having a part movable therewith and adapted to engage said holding formation and be held thereby against movement in one direction, means to operatively connect said element with a device to be actuated and released by said mechanism, a movable control member mounted for movement relative to said fixed holding member, said control member being engageable by said part of said holding element in the movement of the latter and being provided with successive formations of different character which are alternately engageable by said part in said movements of said holding element to prevent engagement of said part with said holding formation of said holding member and to permit engagement of said part with said holding formation to prevent further movement of said element in said last named direction.

12. A releasable actuator mechanism of the type described, comprising a fixed holding member provided with a holding formation, a holding element mounted for actuating and releasing movements in opposite directions and having a part movable therewith and adapted to engage said holding formation and be held thereby against movement in one direction, means to operatively connect said element with a device to be actuated and released by said mechanism, and a movable control member mounted for movement relative to said fixed holding member, said control member being engageable by said part of said holding element in the movement of the latter and being provided with successive formations of different character which are alternately engageable by said part in said movements of said holding element, one of said formations comprising a relatively shallow notch engaged by said part in its releasing movement and effective during said last named movement to prevent engagement of said part with said holding formation of said holding member, another formation of said control member comprising a relatively deep notch engaged by said part in said last named movement thereof to permit engagement of said part with said holding formation to prevent further movement of said element in said last named direction.

13. A releasable actuator mechanism of the type described, comprising a fixed holding member provided with a holding formation, a holding element mounted for pivotal actuating and releasing movements in opposite directions and having a part movable therewith and adapted to engage said holding formation and be held thereby against movement in one direction, means to operatively connect said element with a device to be actuated and released by said mechanism and a movable control member pivotally mounted for movement relative to said fixed holding member about the axis of pivotal movement of said element, said control member being engageable by said part of said holding element in the movement of the latter and being provided with successive formations of different character which are alternately engageable by said part in said movements of said holding member, one of said formations comprising a relatively shallow notch engaged by said part in its releasing movement and effective during said last named movement to prevent engagement of said part with said holding formation of said holding member and another formation of said control member comprising a relatively deep notch engaged by said part in said last named movement thereof to permit engagement of said part with said holding formation to prevent further movement of said element in said last named direction.

14. A releasable actuator mechanism of the type described, comprising a fixed holding member provided with a holding formation, a holding element mounted for pivotal actuating and releasing movements in opposite directions and having a part movable therewith and adapted to engage said holding formation and be held thereby against movement in one direction, means to operatively connect said element with a device to be actuated and released by said mechanism, and a movable control member mounted for movement relative to said fixed holding member about the axis of pivotal movement of said element, and means to prevent retrograde movement of said control member, said control member being engageable by said part of said holding element in the movement of the latter and being provided with successive formations of different character which are alternately engageable by said part in said movements of said holding element, one of said formations comprising a relatively shallow notch engaged by said part of said holding element in its releasing movement to prevent engagement of said part with said holding formation of said holding member and another formation of said control member comprising a relatively deep notch engaged by said part in said last named movement thereof to permit engagement of said part with said holding formation to prevent further movement of said element in said last named direction.

15. An actuator and release mechanism of the type described, comprising a fixed holding member having a surface provided with a holding notch, a lever pivoted for opposite actuating and releasing movements relative to said fixed member and having a holding pawl pivotally mounted thereon, said pawl being resiliently urged in a direction to engage said notch, means to operatively connect said lever with a device to be actuated or released, a control member pivotally mounted coaxially of said lever and engageable by said pawl, said control member having a surface extending beyond said notched surface of said fixed holding member and provided with successively arranged, relatively deep and relatively shallow control notches, said relatively deep notch receiving said pawl in the movement of said lever in its releasing direction and permitting said pawl to engage said holding notch of said fixed member, said relatively shallow notch alternately receiving said pawl and preventing engagement of said pawl and said holding notch until said relatively shallow control notch has passed said holding notch.

16. An automatically releasable control mechanism, comprising a fixed support, a holding element mounted on said support for movement to and from released and applied positions, a holding portion on said support engageable by said element to prevent release movement of said element, and control means operated by movement of said element, said control means having a portion engaged by said element as the latter is moved from released to applied position to latch said element in a position in engagement with the holding portion of said support and to prevent movement of said element to released position, said control means having a further portion engaged by said element in response to a small movement of said element from latched position toward applied position to release said element for movement to released position.

17. An automatically releasable control mechanism for a brake system or the like, comprising a fixed support, a brake lever pivoted to said support, a latch element movably mounted on said lever, said support having a holding portion engageable by said latch element to prevent release movement of said lever, and latch control means operated by movement of said lever, said control means having a portion engaged by said element as the latter is moved from released to applied position to cause said latch element to engage with the holding portion of said support to prevent movement of said lever to released position, said control means having a further portion engaged by said element in response to a small movement of said lever from latched position toward applied position to release said latch element.

18. An automatically releasable control mechanism for a brake system or the like, comprising a fixed support, a brake lever pivoted to said support, a latch element movably mounted on said lever, said support having a holding portion engageable by said latch element to prevent release movement of said lever, and latch control means including a control disk movable on said support and operated by movement of said lever, said control disk having a portion engaged by said element as the latter is moved from released to applied position to cause said latch element to engage with the holding portion of said support to prevent movement of said lever to released position, said control disk having a further portion engaged by said latch element in response to a small movement of said lever from latched position toward applied position to release said latch element.

19. An actuator and release mechanism of the type described, comprising a fixed holding member having a surface provided with a holding notch, a lever pivoted for opposite actuating and releasing movements relative to said fixed member and having a holding pawl pivotally mounted thereon, said pawl being resiliently urged in a direction to engage said notch, means to operatively connect said lever with a device to be actuated or released, a control member pivotally and oscillatably mounted coaxially of said lever and engageable by said pawl, said control member having a surface extending beyond said notched surface of said fixed holding member and provided with successively arranged, relatively deep and relatively shallow control notches, said relatively deep notch receiving said pawl in the movement of said lever in its releasing direction and permitting said pawl to engage said holding notch of said fixed member after predetermined movement of said lever and control member in said releasing direction, said relatively shallow notch alternately receiving said pawl upon movement of said lever in its actuating direction, whereby said control member is rotated by said pawl and lever in said releasing movement of the latter, and preventing engagement of said pawl with said holding notch until said relatively shallow control notch has passed said holding notch, and means to restore said movable control member in the direction opposite that in which it is moved by said pawl and lever.

20. An actuator and release mechanism for a brake or like controlled device, comprising a movable control member, a relatively fixed locking member, and a movable holding element operatively connected to said device and having a part movable therewith and coacting with said control and locking members, said locking member having a holding portion engageable by said part of said element to restrain the latter against movement in a direction to release said device, said control member having portions engageable by said part of said holding element to permit and to prevent, respectively, said restraining engagement of said part with said holding portion.

21. An actuator and release mechanism in accordance with claim 20, in which said portions of said movable control member are of different shape and are spaced from one another in the direction of movement of said control member.

22. An actuator and release mechanism in accordance with claim 20, in which said portions of said movable control member are of different shape and are spaced from one another in the direction of movement of said control member, and in which said control member has unidirectional, step by step rotative movement in successive operations of said mechanism.

References Cited in the file of this patent

UNITED STATES PATENTS

| | | |
|---|---|---|
| 373,455 | Gould | Nov. 22, 1887 |
| 880,856 | Bartosik et al. | Mar. 3, 1908 |
| 1,238,910 | Henderson | Sept. 4, 1917 |
| 2,666,338 | Sandberg | Jan. 19, 1954 |

FOREIGN PATENTS

| | | |
|---|---|---|
| 883,411 | Germany | July 16, 1953 |